United States Patent [19]

Wydeven et al.

[11] Patent Number: 4,600,420
[45] Date of Patent: Jul. 15, 1986

[54] FILTER WITH INTEGRAL STRUCTURAL FRAMEWORK

[75] Inventors: Robert M. Wydeven, Eagan; Warren Gehl, Minneapolis, both of Minn.

[73] Assignee: Donaldson Company, Inc., Minneapolis, Minn.

[21] Appl. No.: 790,783

[22] Filed: Oct. 21, 1985

Related U.S. Application Data

[63] Continuation of Ser. No. 554,828, Nov. 23, 1983, abandoned.

[51] Int. Cl.$^4$ .................................................. B01D 25/06
[52] U.S. Cl. ...................................... 55/501; 55/486; 55/514; 55/527; 428/351; 264/136
[58] Field of Search ............... 55/486, 487, 501, 502, 55/511, 514, 527; 428/351; 264/136

[56] References Cited

U.S. PATENT DOCUMENTS

| | | |
|---|---|---|
| 2,147,792 | 2/1939 | Knight . |
| 2,521,984 | 9/1950 | Lang ................................ 55/486 |
| 2,591,490 | 4/1952 | Allen ................................ 55/514 |
| 2,888,095 | 5/1959 | Perrini .............................. 55/528 |
| 3,017,698 | 1/1962 | Hambrecht . |
| 3,049,121 | 8/1962 | Brumfield . |
| 3,069,831 | 12/1962 | Young et al. . |
| 3,408,438 | 10/1968 | Staunton ........................ 55/497 |
| 3,458,130 | 7/1969 | Juhlin ............................ 55/511 |
| 3,521,630 | 7/1970 | Westberg et al. ................ 55/528 |
| 3,807,146 | 4/1974 | Witkowski . |
| 3,998,255 | 12/1976 | Mather et al. . |
| 4,011,067 | 3/1977 | Carey, Jr. ........................ 55/487 |
| 4,240,420 | 12/1980 | Riaboy . |
| 4,340,402 | 7/1982 | Catron ............................ 55/487 |
| 4,354,489 | 10/1982 | Riaboy . |
| 4,356,012 | 10/1982 | Hofstetter . |
| 4,426,212 | 1/1984 | Vandrish ........................ 55/511 |

FOREIGN PATENT DOCUMENTS

| | | | |
|---|---|---|---|
| 2646836 | 10/1976 | Fed. Rep. of Germany | 55/502 |
| 2807546 | 8/1979 | Fed. Rep. of Germany | 55/498 |
| 139811 | 11/1980 | Japan | 55/495 |

*Primary Examiner*—Bernard Nozick
*Attorney, Agent, or Firm*—Merchant, Gould, Smith, Edell, Welter & Schmidt

[57] ABSTRACT

A filter having a structural framework (45) formed integral with and surrounding an active filtering area, and a process for manufacturing the filter are disclosed. The process includes (a) masking selected areas (40) on a sheet (30) of filter media, which areas will serve as the active filtering areas in the end filter product; (b) applying to the remaining exposed areas of the media a liquid-phase filler material; (c) forcing the material to fully penetrate and completely saturate the exposed media areas; (d) and curing the filler-saturated media areas whereby the filler material solidifies within the fiber structure of the media making that portion of the media sheet impervious to any air flow therethrough. The sealed media area (45) provides a structurally integral framework which is continuous with the active filtering media area (40) of the filter. The filter may then be secured along its integral framework area (45) to a suitable mounting substrate surface.

13 Claims, 9 Drawing Figures

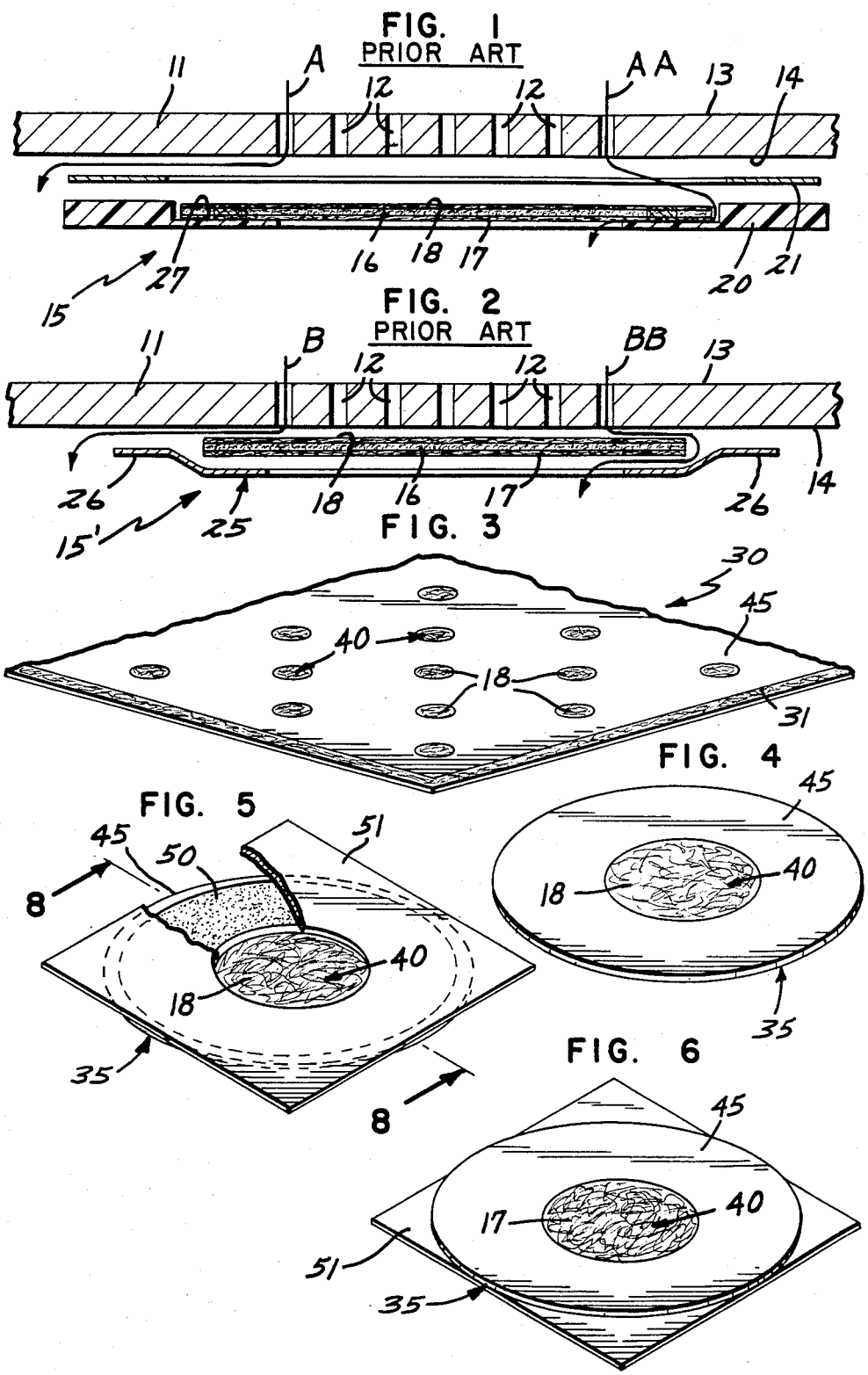

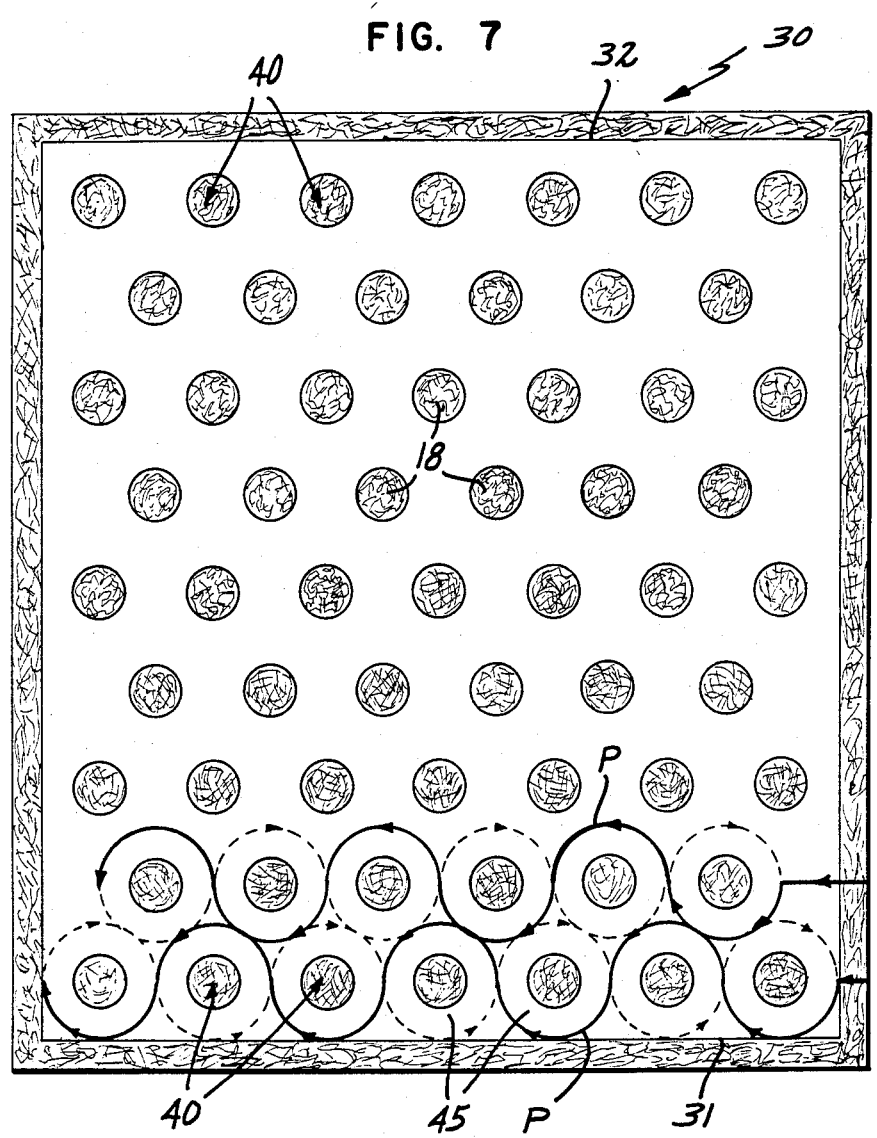

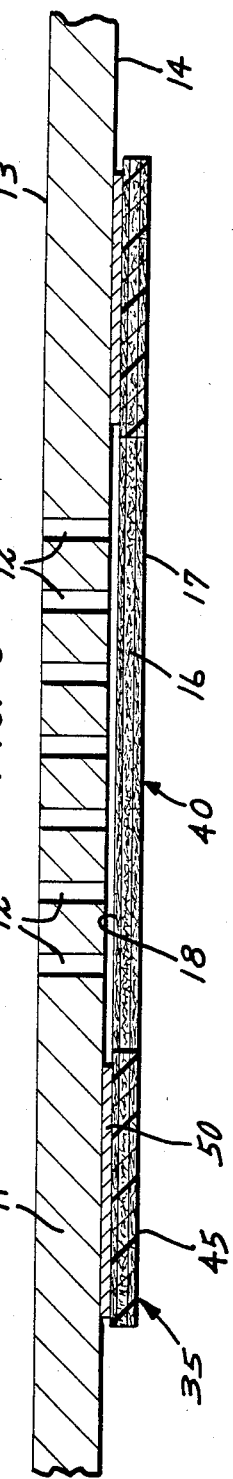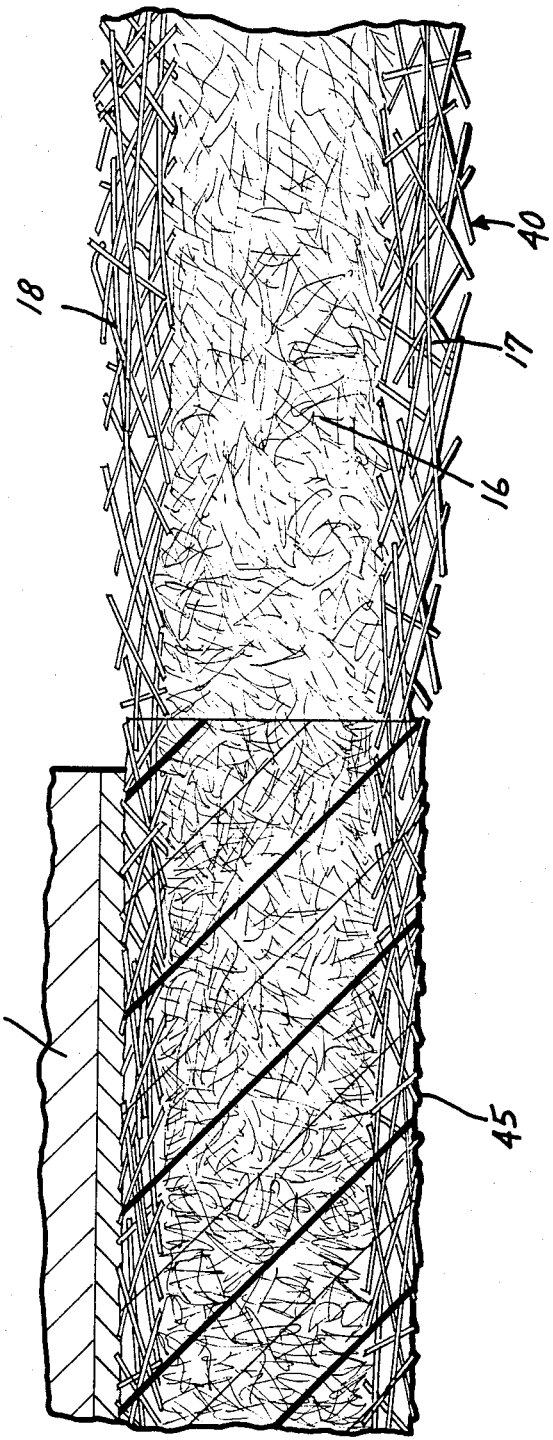

FILTER WITH INTEGRAL STRUCTURAL FRAMEWORK

This is a continuation, of application Ser. No. 554,828, filed Nov. 23, 1983 now abandoned.

TECHNICAL FIELD

The present invention relates to a filter for microscopic particles, having a self-supporting, integral structural framework formed continuous with the media of the filter, and a process for manufacturing the filter.

BACKGROUND

The advances in computer technology have required technological advances in the filters used in connection with the various components of the computers. This has been most evident with the microfilters used in disc-drive applications where it is critical to the operation of the computer that virtually no contaminants be allowed to enter the disc-drive. Generally the function of breather-type microfilters is to filter air passing through the filter as pressure differentials on opposing sides of the filter are equalized. The importance of such microfilters exists in the critical need to prevent head crashing and resulting loss of information stored in the computer's memory.

Prior art breather-type microfilters, currently available commercially, have generally been of two types. These two types are illustrated in FIGS. 1 and 2 of the drawings and will be discussed in greater detail in the description which follows. While each prior art microfilter has served its purpose, a persistent problem remains with both filters, namely the potential for un-filtered air flow to leak past the filter as a result of ineffective bonding of the filter to the mounting surface, as well as, migration of contaminants at the juncture of the media and media holder interface along and below the surface of the media into the "clean air" side of the filter. The present invention is a significant advance in the art which will substantially eliminate the potential for leakage.

Also, with the demand for more compact computers, the size of each computer component, including the microfilters, becomes a concern. Initially, the prior art microfilters were not designed for minimum size. Now they must be. The present invention addresses this requirement and provides a solution not available with the prior art.

SUMMARY OF THE PRESENT INVENTION

The present invention is a filter, manufactured in a manner creating a structural framework for mounting which is integral with the media. The framework, while integral with the filter media, is also continuous with the active filtering media area of the filter. Filter media is sealed with respect to air flow and contaminants by a filler material to form the integral framework. The filler material provides a stiffness to the media which increases the structural integrity of the resulting filter. The process for manufacturing the filter defines the present invention and includes the following steps:

(a) positioning a sheet of filter media upon a surface;

(b) masking selected areas of the sheet which will provide the active filtering media areas and leaving the remaining media areas of the sheet exposed;

(c) contacting the exposed media areas with a liquid-phase filler material;

(d) applying sufficient pressure to the filler material to force the filler material to fully penetrate and completely saturate the exposed media areas;

(e) when complete saturation is accomplished, the application of pressure is terminated; and (f) the filler material is allowed to cure such that the filler material solidifies within the fiber structure of the media and encapsulates the fibers, sealing the media and making it impervious to air flow and contaminants, and forming a structurally integral framework for the earlier masked active filtering areas.

The resulting filter may then be secured to a mounting surface, e.g. a disc-drive cover plate, with only one mechanical seal between the integral framework of the filter and the impermeable mounting surface being required. Thus, where the prior art filters required two separate mechanical seals, the present invention requires only one, with its integral framework serving as a media "seal". Further, the present invention makes possible a significant reduction in the thickness of a microfilter, and the filter of the present invention is substantially uniform in thickness. In contrast, the prior art microfilters are not as "thin" as the present invention as each known prior art filter requires a structural add-on or framework which is exterior to the filter media, whereas the framework of the present invention filter is an interior part of the filter media.

These and other aspects and advantages of the present invention will be discussed further hereinafter in the detailed description which follows

BRIEF DESCRIPTION OF THE DRAWINGS

FIG. 1 is an exploded view in cross-section of one prior art microfilter.

FIG. 2 is an exploded view in cross-section of a second prior art microfilter.

FIG. 3 is a fragmentary view in perspective of a sheet of filters manufactured in accordance with process of the present invention.

FIG. 4 is a view in perspective of a filter of the present invention.

FIG. 5 is a view in perspective of one side of a filter manufactured in accordance with the present invention.

FIG. 6 is a view in perspective of the side of the filter opposite to that shown in FIG. 5.

FIG. 7 is a plan view of a sheet of filters of the present invention and a pattern selected for cutting the filters apart from each other.

FIG. 8 is a view in cross-section of the present invention shown in FIGS. 5 and 6 as mounted to a substrate.

FIG. 9 is a schematic pictorial representation of a magnified portion of the view shown in FIG. 8.

DETAILED DESCRIPTION OF A PREFERRED EMBODIMENT OF THE PRESENT INVENTION

In order to fully appreciate the advances made by the present invention to the state of the art, two examples of known prior art filters will first be examined before the present invention is described. Like reference numerals are used throughout the several views to indicate identical or like elements.

In FIG. 1 there is shown a solid mounting substrate 11 which typically has a plurality of openings 12 for allowing air flow to pass therethrough from an exterior side 13 of the mounting substrate 11 to an opposite interior side 14. A microfilter 15 is secured to the inside substrate surface 14, over the openings 12, to serve as a breather element for the device, e.g. computer disc-drive, and to prohibit any particulate matter from entering the disc-drive area otherwise protected from air flow. Both prior art filters shown in FIGS. 1 and 2 use conventional, laminated high-efficiency particulate air filter media (hereinafter referred to as HEPA media). The laminated or layered filter media has a center layer 16 of glass-fibers covered on both sides by a layer of light-weight, permeable polyester scrim 17,18. The layers 17,18 of scrim allow the media to be handled and processed without undue damage to the glass-fibers of the center layer 16. The three layers 16,17,18 of the filter media are typically bonded together at various points on the surface of the layers.

In the prior art microfilter shown in FIG. 1, the filter media is sealed or bonded to a relatively rigid holder 20. The holder 20 may be plastic and generally has a circular shape and a central, indented portion 27 for receiving the media. The media is bonded to the indented portion 27 of the holder 20. Together the holder 20 and media form a two-component filter structure 15 which is then sealed to the substrate 11 by a thin adhesive ring 21 positioned between the holder 20 and substrate surface 14. Thus, two seals are necessitated before the filter is functional in its intended application. In FIG. 1 arrows designated by the letters A, AA show potential flow paths for unfiltered air to escape past the filter media in the event either or both of the filter's sealed areas proves ineffective.

A similar potential for leakage exists with the prior art microfilter shown in FIG. 2. In this filter application the filter media is in direct contact with the surface 14 of the substrate 11 as no intervening media holder is used. To secure this type of filter 15' to the substrate 11 a piece of adhesive tape 25 is applied to the HEPA media inward of the media perimeter and extended outward beyond the media a sufficient distance to secure the filter media when placed over the substrate openings 12. As a result, the portion 26 of the tape 25 which is not in contact with the media, instead is placed in contact with the surface 14 of the substrate 11 to secure the filter in position relative to the openings 12. Again, as with the prior art filter shown in FIG. 1, two different areas must be sealed before the filter is functional, i.e. the interface area between the filter media and the tape 25, and the interface area between the substrate surface 14 and the tape 25. These two "sealed" areas, however, are sources of potential leakage of unfiltered air flow. In FIG. 2 arrows designated by the letters B,BB indicate the possible flow paths for unfiltered air flow which might occur as a result of an ineffective bonding of either or both sealed areas in the prior art filter.

Despite the fact that the foregoing two examples are among the best breather-type filters commercially available for microfiltration in connection with applications such as computer disc-drives, the increasing demand for thinner filters with greatly reduced potential for leakage of unfiltered air flow, is high. Given the expensive nature of the device requiring the protective nature of a microfilter, such a demand is not insignificant nor ignored. Hence the development of the present invention which answers these particular needs of the industry.

With reference to FIGS. 3–9 a preferred embodiment for the present invention will be described. The media selected to illustrate this embodiment is scrimmed, layered HEPA media as described above. It will be readily appreciated, however, that the invention is applicable to other types of media, including non-scrimmed HEPA media, synthetic as well as natural fiber media, and media of various efficiency levels for applications other than breather-type filter applications.

The objectives of the present invention include (1) a significant reduction in the potential for unfiltered air flow to leak past the filter media and (2) a significant reduction in filter thickness. These objectives are accomplished by the process for manufacturing the invention.

A preferred mechanism for practicing the process for manufacturing the filter of the present invention is a combination of silk-screen printing and laser-cutting technology. In FIG. 3 a portion of a silk-screened sheet 30 of multiple filters is illustrated as would appear before a laser is used to cut the sheet into individual filters 35 like that shown in FIG. 4. To achieve the filter end product the following steps are taken with respect to the silk-screen/laser mechanism:

(1) A sheet of scrimmed HEPA media is placed on a stationary, generally impermeable, mounting surface. The sheet is suitably secured, e.g. with tape, to prevent any shifting of the sheet during the process.

(2) A fine mesh, woven screen is then placed on the sheet, in contact with one surface of the media. The screen is earlier prepared such that portions of the screen are made impervious to fluid and air. The impervious portions overlie those portions of the media sheet which are selected to be the active filtering media for the end filter product. The impervious portions of the screen mask the underlying portions of the media during the process.

(3) After the screen is positioned in place on top of the media, a filler material, preferably a latex resin, either an emulsion or suspension in liquid-phase, is applied on top of the screen.

(4) Mechanical force is then applied to the resin by using a conventional squeegee device. As the squeegee is passed over the screen, the blade of the squeegee forces resin downwardly through the openings in the screen and into the media therebelow.

(5) The amount of resin forced into the media is metered by the selected number of passes which are made over the screen with the squeegee device. With each pass an additional amount of resin is applied to the screen.

(6) The amount of resin forced into the media is equivalent to that determined necessary to completely saturate the media to at least to more than half the thickness of the media, and preferably through the entire thickness of the media.

(7) In the preferred embodiment each side or face surface of the sheet of media is subjected to the forced penetration of liquid-phase resin in order to insure full-penetration of the resin throughout the portions of the media which are not masked.

(8) When one side or surface of the media has been adequately penetrated and saturated with resin, the screen is removed and the saturated sheet of media is allowed to dry. The process is then repeated for the reverse side of the sheet. The selection of a symmetrical arrangement of masked portions allows alignment of respective masked portions on both sides of the media sheet. Thus, the cured sheet of media shown in FIG. 3 would appear identical on its reverse side.

(9) After step (8), the resin is allowed to cure and, together with the encapsulated media fibers, the cured resin forms a structural framework 45 for the filter product.

(10) The amount of resin applied to the second side of the media sheet is that amount necessary to fully penetrate and saturate the depth of media untouched by application of resin to the first side of the media. A process of trial and error is used to determine the number of passes necessary to achieve one hundred percent saturation of the unmasked portions of the media. To verify that full penetration has been achieved the media is inspected to determine if delamination of the media layers is possible. If delamination is not possible then full penetration and complete saturation has been accomplished. Air impermeability of the resin-saturated portion of the resulting sheet of multiple filters may be further verified using an industry standard air permeability tester.

(11) Depending on the type of resin selected, the curing steps of the process may require exposing the media to a source of heat for a period of time to insure the resin is cured to a degree where it will not redisperse.

(12) When the resin in the media is cured such that it is immobilized and solidified the sheet is then ready to be cut into a number of separate filters.

(13) In the present invention a computer-controlled laser-beam is used to cut and fuse the cut edges of each filter from the media sheet. The laser technology used in the preferred embodiment is state-of-the art technology available commercially, e.g. in the preferred embodiment laser technology available from Laserdyne, Inc. a division of Data Card Corporation, was selected.

(14) With reference to FIG. 7, the cured sheet of media is placed on a stationary table. The computer of the laser machine is pre-programmed to move the laser beam through a selected pattern. In the preferred embodiment, the masked portions of the media are circular in shape and have been spaced apart from each other in rows which are offset with respect to adjacent rows on either side thereof. With this arrangement circular shaped filters are then cut. The pattern for this embodiment is essentially a serpentine line following a sine-wave pattern as represented by arrows P in FIG. 7. The laser beam is passed in this pattern from one edge 31 to the opposing edge 32 of the sheet moving from row to row until the entire sheet has been cut. The end result is a number of mass-produced identical circular filters of the type illustrated in FIG. 4.

(15) The final step in the process is the application of a pliable adhesive ring 50 to one side of the filter. The adhesive selected must be compatible with the resin used in the filter product to insure adequate adherence for the life of the filter. The ring 50 is adhesive on both sides. A silicone-treated release paper 51 is placed over one side of the ring for shipping and handling purposes. When mounting the filter in its intended application the release paper 51 is removed from the adhesive ring 50, exposing the adhesive for contact with a substrate surface, e.g. a cover plate for a computer disc-drive.

Of course, persons skilled in the art will appreciate that other mechanisms may be used to practice the present invention. For example, a jig (not shown) could be constructed where the media is placed between a combination of stationary members which serve to mask selected areas of the media and contain the filler material therebetween, and movable rams arranged relative to the stationary members to force the filler material into the fiber structure of the media. A number of variations for this type of mechanism are possible and the invention is thus not believed limited to any particular arrangement. An important feature of the present invention is that regardless of the particular mechanism selected to practice the manufacturing process, the process steps essential to the invention remain the same, i.e.: (a) the use of a sheet of filter media; (b) masking selected portions of the media sheet in order to provide an active filtering media area for the filter end-product; (c) placing a liquid-phase filler material in contact with the remaining exposed media areas; (d) applying sufficient pressure to the filler material in order to force the material into the media to the degree necessary to fully saturate the media and (e) after achieving complete saturation of the unmasked portions, removing the source of pressure and allowing the filler material to solidify. The individual filters may then be cut apart from each other. The end product is the filter of the present invention, namely, a filter having a self-supporting framework which is not only continuous with the active filtering media area, but is structurally integral with the media and which seals that portion of the media containing the filler material so as to be impermeable to air flow and contaminants.

From an examination of FIGS. 8 and 9, the superior and novel features of the present invention over the prior art can be appreciated. In FIG. 8 a cross-sectional view of the present invention may be compared with the exploded cross-sectional views of the two prior art filters shown in FIGS. 1 and 2. The single-piece construction of the present invention is unique from the two-piece constructions of both prior art filters. The diffusion of the filler material through the fiber structure of the media, accomplished without damage to the fibers and without material change in the thickness of the media, results in a filter which is substantially uniform in thickness having portions of media containing filler material which are impervious. The resulting filter thickness is substantially equivalent to the thickness of the media itself. In contrast the thickness of the prior art filter in FIG. 1 includes not only the thickness of the media but that of the holder 20 as well. Similarly, the thickness of the prior art filter shown in FIG. 2 is of a "double" nature as its two-part construction creates an additional area for leakage of unfiltered air which is not found in the present invention.

A major difference between the present invention and the prior art filters is the elimination of one of two potential seal leakage areas. This is accomplished by eliminating the need to mechanically bond the filter media to any holder 20 or adhesive tape 25 in order to provide the media structural integrity. The filter of the present invention requires only one mechanical seal between its structurally integral framework 45 and the substrate mounting surface 14. In FIG. 9 the magnified cross-sectional view shows portions of both the active filtering media area 40 and the air-impermeable framework area 45 of the filter. It can be seen in FIG. 9 that the adhesive of the strip 50 will encapsulate any fibers extending from the framework 45 and fill any voids which might otherwise exist in the interface between the adhesive ring 50 and the surface of the framework 45 to which the strip is adhered. This interface area is illustrated by the contrasting cross-hatched region of the adhesive ring 50. For unfiltered air to leak past the filter there must be an ineffective seal between the filter framework 45 and the substrate 11 as the resin-filled media framework 45 itself is completely impermeable to air. Thus, a significant reduction in leakage potential is achieved by the present invention over the prior art in that the greatest potential for leakage is eliminated when it is not necessary to interface the air permeable media with an adhesive or an exterior holder.

Other advantages of the present invention over the prior art include the ability of the invention to survive the handling necessary to properly position the filter over the substrate openings. The unique construction of the present invention eliminates the possiblity of the media delaminating when the filter is flexed while positioning it over the substrate openings 12. This is because the flexible resin/fiber framework 45 is integral with the media itself. This is not true of the prior art filters where even minimal handling, such as that necessary to merely position the filter accurately over the substrate openings, may cause delamination of the filter's component layers and shedding of potentially damaging particles. With the present invention's framework 45 a flexibility and durability is provided which allows tremendously more handling to be possible when mounting the filter than could ever be hoped for with the prior art filters.

Furthermore the present invention may be mass-produced as described above. This results in a significant commercial advantage over the prior art filters which typically are produced individually in step-by-step mechanical processes. Further, the use of laser technology to separate or cut the mass-produced filters apart from each provides another major advantage. Also, the "free" or cut peripheral edges of the filter media are encapsulated in the flexible resin framework thus minimizing any shedding of glass-fibers from the cut edges as compared to prior art filters where it is possible for fibers to be freed in the mounting process and potentially cause damage.

From the foregoing it will be appreciated that a variety of resins, including thermosetting and thermoplastic resins may be used as the filter material. Such may include hot melt plastics, urethanes, plastisols, epoxies, phenolic and ultra-violet (U.V.) cured resins, waxes, rubber-latex resins, etc. Such materials may also be selected from two-part resins. The process for manufacture would be modified accordingly as dictated by the type of resin selected in order to obtain the required liquid-phase and curing aspects for the particular material. Because of the variety of possible filler materials, the integral framework can be made pliable or rigid to varying degrees. Also the resin and hence the saturated media may be tinted in a variety of colors and textures to aid quality control measures, e.g., such as verifying alignment of the saturation pattern on both faces of the media with respect to each other, and aid in verifying full resin penetration. Furthermore, the filter may be finished, without or with surface tack adhesion as an inherent property of the filler-resin material or by a separate silk-screening step of applying an adhesive film or material to the surface of the resin framework portion of the filter sheet. These options may be used in lieu of applying a separate adhesive ring 50 to the filter as described above.

What is claimed is:

1. A fibrous media filter having a structurally integral frame resulting in a substantially uniform filter thickness, said filter media including an active-filtering media area surrounded by an air-impermeable media area substantially saturated with a cured resin filler material defining the frame the two media areas being constructed from a single sheet of fibrous media material, said filter being manufactured by a process comprising the steps of:

(a) positioning a sheet of fibrous filter media upon a surface;
   (b) masking the active-filtering area of the sheet of filter media and leaving a surrounding area of the sheet exposed;
   (c) contacting the exposed media area with a liquid-phase resin filler material;
   (d) applying a source of pressure to the filler material to force the resin filler material to penetrate and completely saturate the exposed media areas without substantially altering the thickness of the exposed media;
   (e) removing the source of pressure;
   (f) unmasking the masked area of the filter media; and
   (g) curing the saturated exposed media area whereby the resin filler material solidifies within the fiber structure of the media and encapsulates the fibers, making the saturated media impervious to air flow and contaminants, the media area saturated with the resin filler material being structurally integral and continuous with the earlier masked active-filtering media area forming a filter which is self-supporting.

2. The filter of claim 1 wherein the filter media is a glass fiber, high-efficiency particulate air media.

3. The filter of claim 1 wherein the resin filler material is a thermoplastic resin.

4. The filter of claim 1 wherein the resin filler material is a thermosetting resin.

5. The filter of claim 1 wherein step (b) of the process further includes overlaying the sheet of media with an open woven-mesh screen having portions which are fluid impervious, said fluid impervious portions masking said active-filtering area of the sheet of filter media, with the remaining open, woven mesh of the screen overlying the remaining exposed surrounding area of the sheet of media.

6. The filter of claim 5 wherein step (d) of the process further includes passing a device over the screen in a manner which forces the resin filler material ahead of the device, downwardly through the mesh of the screen and into the unmasked portion of the media therebelow.

7. The filter of claim 1 wherein the process further includes a step (h), subsequent to step (g), of cutting around the perimeter of the cured sheet media area to form a desired filter shape.

8. The filter of claim 7 wherein step (h) of the process further includes using a laser beam to effect the cutting of the cured media.

9. A fibrous media filter having a structurally integral frame resulting in a substantially uniform filter media thickness, said filter including an active-filtering media area surrounded by an air-impermeable media area substantially saturated with a cured resin filler material defining the frame, the two media areas being constructed from a single sheet of fibrous media material, said filter being manufactured by a process comprising the steps of:

(a) positioning a sheet of fibrous filter media upon a surface, the sheet of media having a first face surface and a second face surface opposition the first face surface;
   (b) masking the active-filtering area on the first face surface of the sheet of media and leaving a surrounding area of the first face surface exposed by using a screen having fluid-impervious portions and open-mesh portions which correspond respectively to the masked area and said surrounding area of the sheet of media therebelow;

(c) contacting the exposed media area with a liquid-phase resin filler material;

(d) applying a source of pressure to the resin filler material to force the resin filler material to pass through the open mesh portions of the screen and penetrate and saturate the exposed media area of the first face surface therebelow without substantially altering the thickness of the exposed media;

(e) removing the source of pressure;

(f) removing the screen to expose the entire first face surface of the sheet of media;

(g) drying the saturated exposed media area;

(h) repeating steps (a) through (g) for the second face surface of the sheet of media with the masked media area and exposed media area on the second face surface corresponding respectively to like masked area and exposed area on the first face surface; and (i) after step (h), allowing the resin filler material to solidify within the fiber structure of the media and encapsulate the fibers, thereby sealing the saturated media and leaving it impervious to air flow and contaminants, the media area saturated with the resin filler material being structurally integral and continuous with the earlier masked media area forming a filter which is self-supporting, with the earlier masked media area providing the active-filtering media area of the filter.

10. The filter of claim 9 wherein the process further includes a step (j) subsequent to step (i) of using a laser beam moving in a pre-determined pattern to cut the perimeter of the cured sheet media and form a predetermined filter shape.

11. A self-supporting microfiltration air filter comprising a sheet of fibrous media filter material wherein the perimeter of said fibrous media filter material is solidified by the integral incorporation of impervious resin filler materials so that the fiber structure and thickness of said solidified media is substantially unaltered and undamaged by the filler material at the interface between the solidified perimeter and the active-filtering area, said solidified perimeter framing and providing structural support for said active-filtering area, at least one face of said solidified perimeter providing a substantially solid and impermeable surface which may be adhesively attached to a filter supporting substrate.

12. The microfiltration filter according to claim 11 wherein the fibrous media filter material is a glass fiber, high-efficiency particulate air (HEPA) media.

13. The microfiltration filter according to claim 11 wherein said impervious resin filler material is a thermoplastic or thermosetting resin.

* * * * *